US012615107B2

(12) United States Patent
Itaba

(10) Patent No.: US 12,615,107 B2
(45) Date of Patent: Apr. 28, 2026

(54) TRANSMITTING METHOD, RECEIVING METHOD AND TRANSMITTING APPARATUS FOR PACKET DATA CONVERGENCE PROTOCOL DATA

(71) Applicant: NEC Corporation, Tokyo (JP)

(72) Inventor: Naoto Itaba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 288 days.

(21) Appl. No.: 18/281,794

(22) PCT Filed: Dec. 15, 2021

(86) PCT No.: PCT/JP2021/046206
§ 371 (c)(1),
(2) Date: Sep. 13, 2023

(87) PCT Pub. No.: WO2022/195991
PCT Pub. Date: Sep. 22, 2022

(65) Prior Publication Data
US 2024/0163013 A1 May 16, 2024

(30) Foreign Application Priority Data

Mar. 18, 2021 (JP) ................................. 2021-044619

(51) Int. Cl.
*H04L 1/1607* (2023.01)
*H04L 5/00* (2006.01)
*H04W 80/02* (2009.01)
(52) U.S. Cl.
CPC .......... *H04L 1/1642* (2013.01); *H04L 5/0044* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2009/0161545 A1* | 6/2009 | Ho | ........................ | H04W 28/10 |
| | | | | 455/452.2 |
| 2012/0300614 A1* | 11/2012 | Ha | ........................ | H04L 1/0045 |
| | | | | 370/216 |
| 2018/0027512 A1* | 1/2018 | Bergquist | .......... | H04W 74/0866 |
| | | | | 370/331 |

FOREIGN PATENT DOCUMENTS

| | | |
|---|---|---|
| JP | 2014-216847 A | 11/2014 |
| JP | 2015-089009 A | 5/2015 |
| JP | 2017-536734 A | 12/2017 |
| WO | 2016/137381 A1 | 9/2016 |

OTHER PUBLICATIONS

International Search Report for PCT Application No. PCT/JP2021/046206, mailed on Mar. 22, 2022.
3GPP TS 38.323 V16.2.0 (Sep. 2020), Technical Specification Group Radio Access Network; NR; Packet Data Convergence Protocol (PDCP) specification, pp. 1-40.

* cited by examiner

*Primary Examiner* — Diane L Lo
(74) *Attorney, Agent, or Firm* — Sughrue Mion, PLLC

(57) ABSTRACT
A transmitting apparatus (10, 20) includes a control unit (12, 22) configured to generate PDCP (Packet Data Convergence Protocol) data containing information indicating at least a part of a HFN (Hyper Frame Number) held in the transmitting apparatus, and a transmitting unit (11, 21) configured to transmit the PDCP data generated by the control unit to a receiving apparatus.

8 Claims, 7 Drawing Sheets

TRANSMITTING METHOD, RECEIVING METHOD AND TRANSMITTING APPARATUS FOR PACKET DATA CONVERGENCE PROTOCOL DATA

This application is a National Stage Entry of PCT/JP2021/046206 filed on Dec. 15, 2021, which claims priority from JP Patent Application 2021-044619 filed on Mar. 18, 2021, the contents of all of which are incorporated herein by reference, in their entirety.

TECHNICAL FIELD

The present disclosure relates to a transmitting apparatus, a radio communication method, a radio communication system, a receiving apparatus, and a program.

BACKGROUND ART

Techniques for performing radio communication using PDCP (Packet Data Convergence Protocol) are known (see, for example, Patent Literatures 1 and 2). PDCP provides functions such as transmission, header compression, and encryption of U-plane (User plane) and C-plane (Control plane) data.

According to the 3GPP (Third Generation Partnership Project) standard, when PDCP detects a failure (Window stall) to receive a response signal generated in response to transmitted data, a transmitting apparatus sends a control signal to a receiving apparatus to initialize the Window (see, for example, Non-Patent Literature 1). Here, the control signal is a Radio Resource Control (RRC) message containing a full configuration. When the UE receives the control signal, it initializes the window by reconfiguring the PDCP.

CITATION LIST

Patent Literature

Patent Literature 1: Japanese Unexamined Patent Application Publication No. 2014-216847
Patent Literature 2: Japanese Unexamined Patent Application Publication No. 2015-089009

Non Patent Literature

Non-Patent Literature 1: 3GPP TS 38.323 V16.2.0 (2020-09)

SUMMARY OF INVENTION

Technical Problem

However, in the related technology, there is a problem that data communication is suspended for a long time because the Window is re-initialized if the reception of the response signal generated in response to the transmitted data fails. An object of the present disclosure is to provide, in view of the aforementioned problem, a transmitting apparatus, a radio communication method, a radio communication system, a receiving apparatus, and a program each adapted to shorten the period during which data communication cannot be properly performed.

Solution to Problem

According to a first aspect of the present disclosure, a transmitting apparatus includes: a control unit configured to generate PDCP (Packet Data Convergence Protocol) data containing information indicating at least a part of a HFN (Hyper Frame Number) value held in the transmitting apparatus; and a transmitting unit configured to transmit the PDCP data generated by the control unit to a receiving apparatus.

Further, according to a second aspect of the present disclosure, a transmitting apparatus performs processes of: generating PDCP (Packet Data Convergence Protocol) data containing information indicating at least a part of a HFN (Hyper Frame Number) value held in the transmitting apparatus; and transmitting the generated PDCP data to a receiving apparatus.

Further, according to a third aspect of the present disclosure, a radio communication system includes a transmitting apparatus and a receiving apparatus, the transmitting apparatus including: a control unit configured to generate PDCP (Packet Data Convergence Protocol) data containing information indicating at least a part of a HFN (Hyper Frame Number) value held in the transmitting apparatus; and a transmitting unit configured to transmit the PDCP data generated by the control unit to a receiving apparatus, the receiving apparatus including: a receiving unit configured to receive PDCP data transmitted from the transmitting apparatus; and a receiving apparatus control unit configured to update the HFN value held in the receiving apparatus based on information indicating at least the part of the HFN value contained in the PDCP data received by the receiving unit.

Further, according to a fourth aspect of the present disclosure, a receiving apparatus includes: a receiving unit configured to receive PDCP (Packet Data Convergence Protocol) data containing information indicating at least a part of a HFN (Hyper Frame Number) value held in a transmitting apparatus; and a control unit configured to update the HFN value held in the receiving apparatus based on the information indicating at least a part of the HFN value contained in the PDCP data received by the receiving unit.

Further, according to a fifth aspect of the present disclosure, a program is configured to cause a receiving apparatus to execute:

processing of receiving Packet Data processing Convergence Protocol (PDCP) data containing information indicating at least a part of a HFN (Hyper Frame Number) value held in a transmitting apparatus; and
processing of updating the HFN value held in the receiving apparatus based on the information indicating at least a part of the HFN value contained in the data of the received PDCP.

Advantageous Effects of Invention

According to an aspect of the present disclosure, it is possible to shorten the time period during which data communication cannot be properly performed.

EXAMPLE EMBODIMENT

The principles of the present disclosure will be described with reference to several illustrative example embodiments. These example embodiments are given for illustrative purposes and assist those of ordinary skill in the art in understanding and implementing the present disclosure without suggesting any limitations on the scope of the present disclosure. The present disclosure described herein is implemented in various methods other than those described below.

In the following description and claims, unless otherwise defined, all technical and scientific terms used herein have the same meaning as generally understood by those of ordinally skill in the art to which the present disclosure pertains.

Example embodiments of the present disclosure will be described below with reference to the drawings.

<System Configuration>

Figure 1:
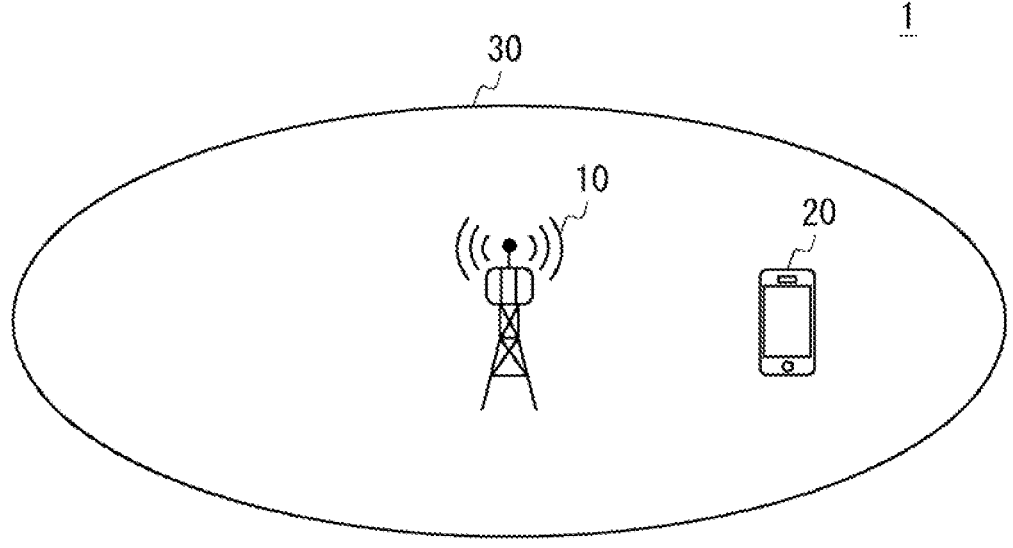
FIG. 1 is a diagram showing a configuration example of a radio communication system according to an example embodiment.

FIG. 1 is a diagram showing a configuration example of a radio communication system 1 according to an example embodiment. In FIG. 1, the radio communication system 1 includes a base station 10 and a terminal 20. The range (coverage) within which the terminal 20 can receive radio waves from the base station 10 is referred to as a cell 30. The respective numbers of the base stations 10 and the terminals 20 are not limited to the example shown in FIG. 1. Either the base station 10 or the terminal 20 is an example of a "transmitting apparatus" and the other one is an example of a "receiving apparatus".

The base station 10 and the terminal 20 are connected to each other to be able to communicate with each other by radio communication systems such as, for example, the 5th generation mobile communication system (5G), the 4th generation mobile communication system (4G), or wireless LAN (Local Area Network).

Note that the term "base station" (BS: Base Station) as used in the present disclosure refers to a device capable of providing or hosting a cell or a coverage with which the terminal 20 can communicate. Examples of the base station 10 include, for example, gNB (NR Node B), Node B (Node B or NB), Evolved Node B (eNodeB or eNB radio), Remote Radio Unit (RRU), etc. Examples of the base station 10 also include, but are not limited to, Radio Head (RH), Remote Radio Head (RRH), and Low Power Node (e.g., femtonodes, piconodes), etc.

The term "terminal" as used in the present disclosure refers to any device that has a function of performing communication wirelessly or through cables. Examples of the terminal 20 include user equipment (UE), personal computers, desktops, mobile phones, cellular phones, smartphones, wearable devices, personal digital assistants (PDAs), etc. Examples of the terminal 20 also include portable computers, image capturing devices such as digital cameras, game devices, music storage and playback devices, internet devices that enable internet access and browsing, etc.

The communication (radio communication) described in the present disclosure may comply with such standards as, for example, the 5G (5th generation mobile communication system, NR: New Radio), the 4G (4th generation mobile communication system), the 3G (3rd generation mobile communication system), etc. Note that the 4G may include, for example, LTE (Long Term Evolution) Advanced, WiMAX2, and LTE. The radio communication described in the present disclosure may also comply with such standards as, for example, Broadband Code Division Multiple Access (W-CDMA: Wideband Code Division Multiple Access), Code Division Multiple Access (CDMA), Global System for Mobile (GSM), and Local Area Network (wireless LAN). The radio communication described in the present disclosure may also be implemented according to any generation of radio communication protocols currently known or to be developed in the future. The term "downlink" as used in the present disclosure refers to a link from the base station 10 to the terminal 20, and the term "uplink" as used in the present disclosure refers to a link from the terminal 20 to the base station 10.

An example of a case of a failure (Window stall) to receive a response signal generated in response to the transmitted data in the downlink of data transmitted from the base station 10 to the terminal 20 occurring will be described. In the case of a downlink, the base station 10 is an example of a "transmitting apparatus" and the terminal 20 is an example of a "receiving apparatus".

In the case of an uplink where data is transmitted from the terminal 20 to the base station 10, the base station 10 serves as an example of a "receiving apparatus" and the terminal 20 serves as an example of a "transmitting apparatus". In the case of an uplink, the source (the transmitting end) and the destination (the receiving end) of the data may serve vice versa to those in the case of a downlink described below. Therefore, in the case of the uplink, for example, the base station 10 serves as the receiving end and the terminal 20 serves as the transmitting end, and the term downlink shall be replaced by the term uplink in the description of downlink given below.

<Configuration>

Figure 2:
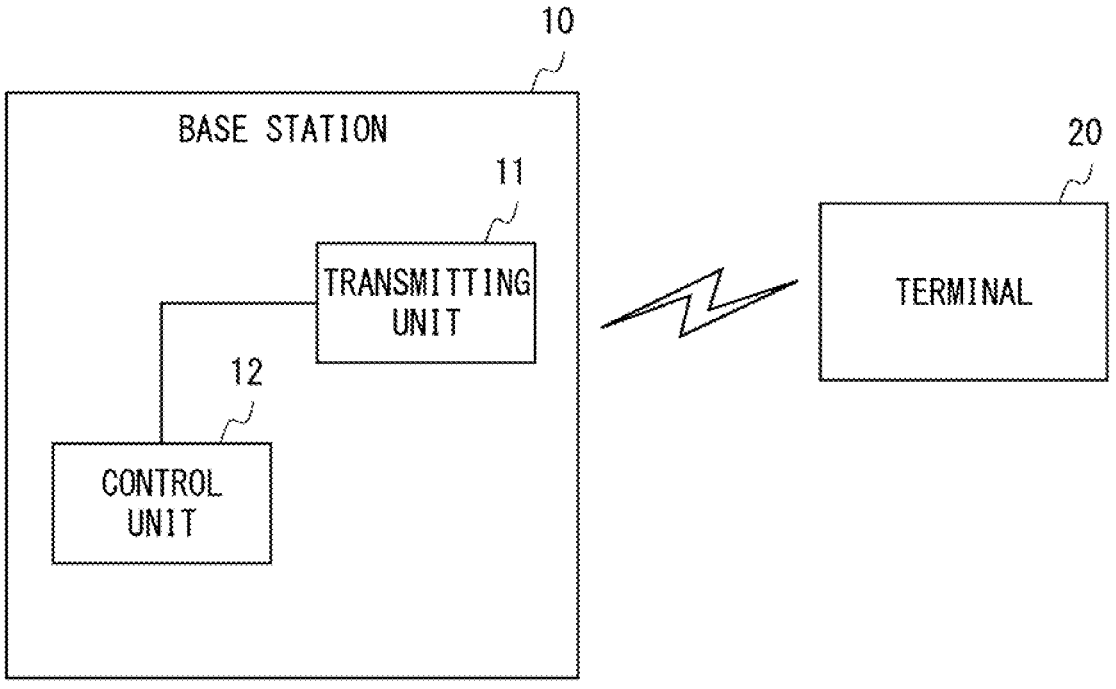
FIG. 2 is a diagram showing a configuration example of a base station according to an example embodiment.
Figure 3:
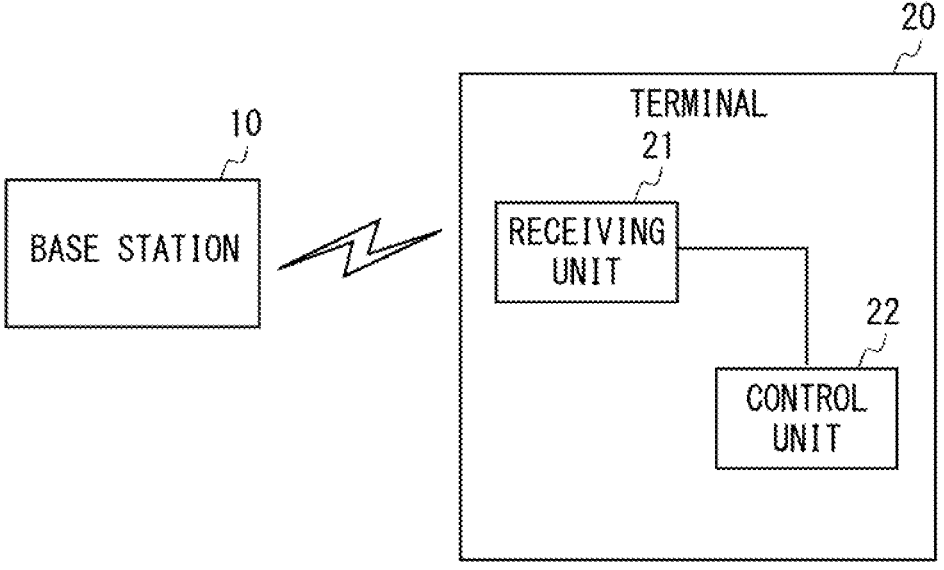
FIG. 3 is a diagram showing a configuration example of a terminal according to an example embodiment.

Next, with reference to FIG. 2 and FIG. 3, the configuration of the base station 10 and the configuration of the terminal 20 according to an example embodiment will be described. FIG. 2 is a diagram showing an example of a configuration example of the base station 10 according to an example embodiment. FIG. 3 is a diagram showing an example of a configuration of the terminal 20 according to an example embodiment. The configurations shown in FIG. 2 and FIG. 3 are mere examples. The names of the parts can be any names if the processing of the present disclosure can be implemented.

<<Base Station 10>>

The base station 10 includes a transmitting unit 11, and a control unit 12. The transmitting unit 11 converts digital data into radio waves and transmits them from an antenna to the terminal 20 according to the instructions from the control unit 12. The transmitting unit 11 transmits PDCP (Packet Data Convergence Protocol) data generated by, for example, the control unit 12 to the terminal 20. The control unit 12 performs various controls. The control unit 12, for example, performs various processing for the base station 10 to perform radio communication with the terminal 20. The control unit 12, for example, generates PDCP data containing information indicating at least a part of the HFN (Hyper Frame Number) held in the base station 10.

<<Terminal 20>>

The terminal 20 includes a receiving unit 21 and a control unit 22. The receiving unit 21 receives the radio waves transmitted from the base station 10 through an antenna and converts the received radio waves into digital signals. The receiving unit 21, for example, receives PDCP data containing information indicating at least a part of the HFN value held in the base station 10. The control unit 22 performs various controls. The control unit 22, for example, performs various processing for the terminal 20 to perform radio communication with the base station 10. The control unit 22, for example, updates the HFN value held in the terminal 20 based on the information indicating at least a part of the HFN value contained in the PDCP data received from by the receiving unit 21.

<Processing>

Figure 4:
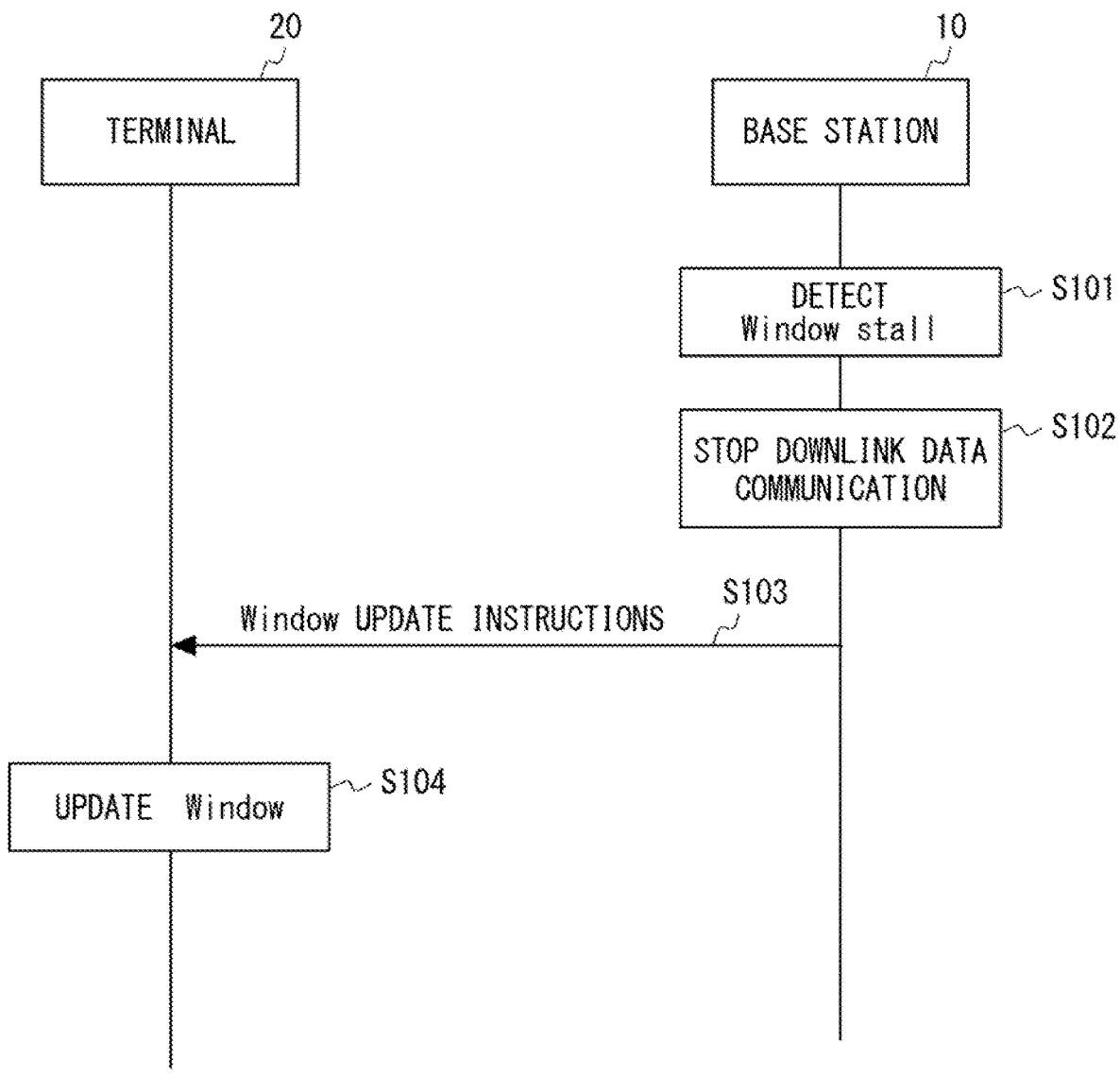
FIG. 4 is a sequence diagram showing an example of processing of a radio communication system according to an example embodiment.
Figure 5:
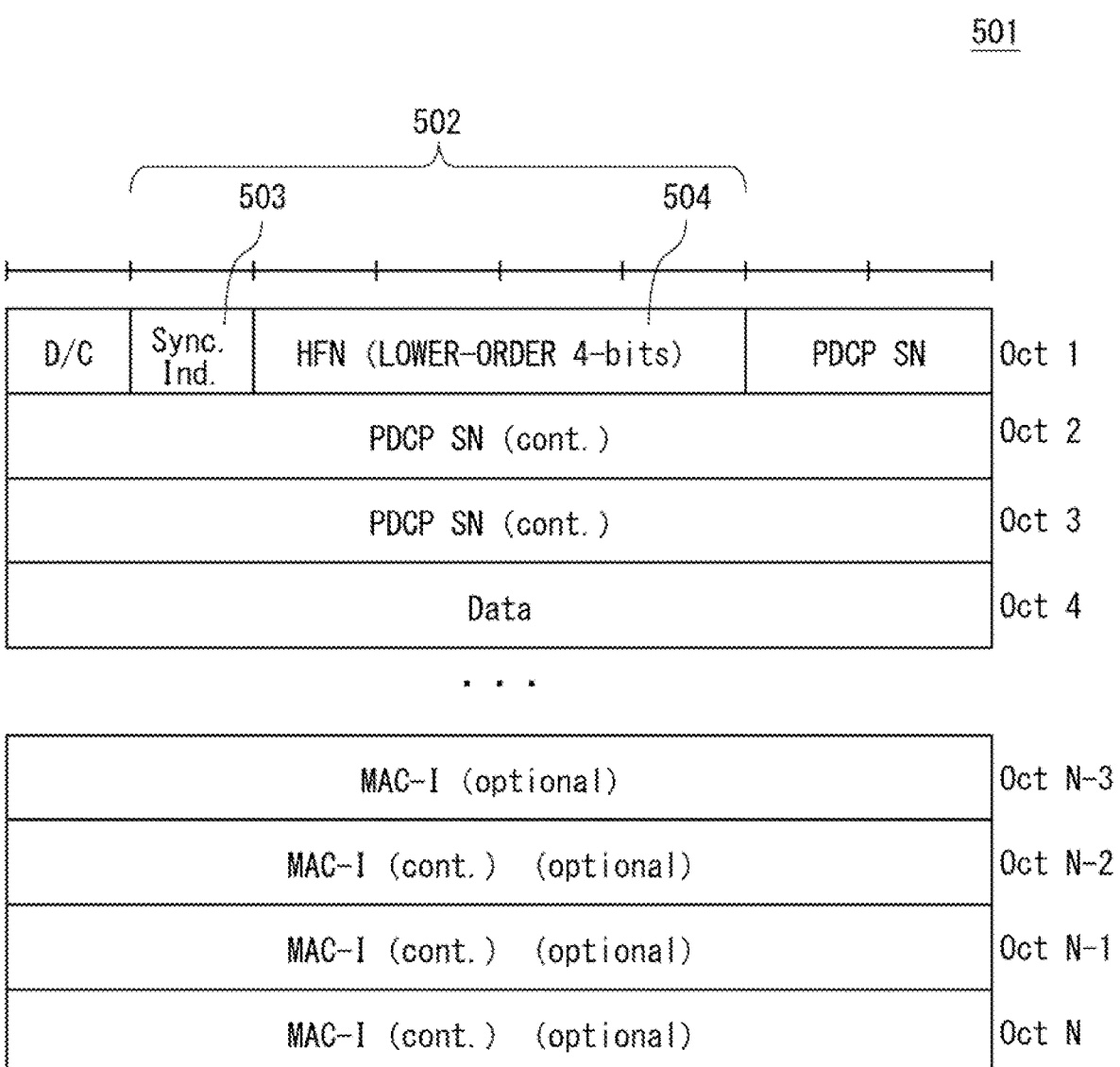
FIG. 5 is a diagram showing an example (No. 1) of a data format of PDCP which can include Window update instructions according to an example embodiment.
Figure 6:
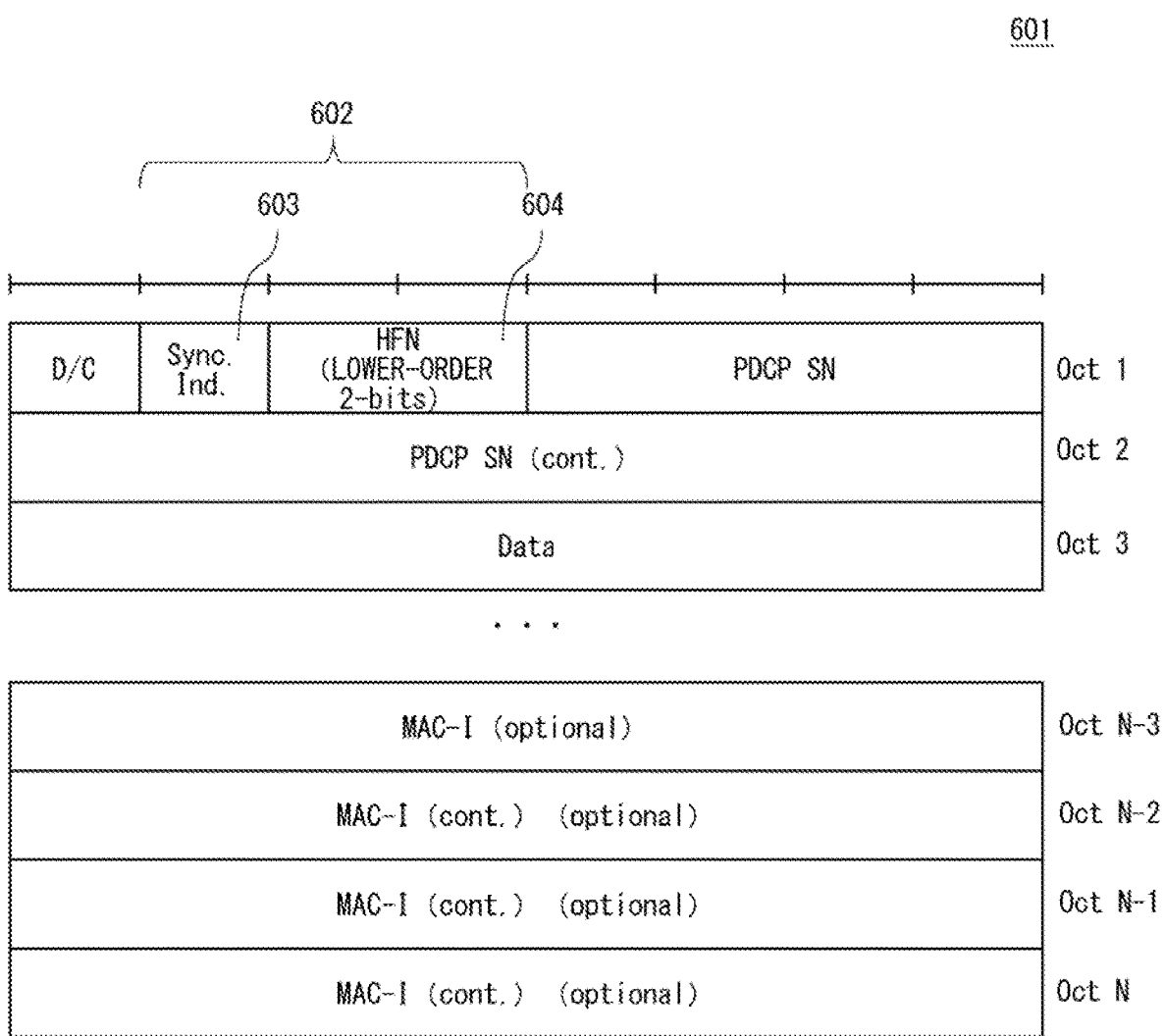
FIG. 6 is a diagram showing an example (No. 2) of a data format of PDCP which can include Window update instructions according to an example embodiment.

Next, referring to FIG. 4, an example of processing performed by the radio communication system 1 according to an example embodiment will be described. FIG. 4 is a sequence diagram showing an example of processing of the radio communication system 1 according to an example embodiment. FIG. 5 is a diagram showing an example (No. 1) of a data format of PDCP which can include Window update instructions according to an example embodiment. FIG. 6 is a diagram showing an example (No. 2) of a data format of PDCP which can include Window update instructions according to an example embodiment.

In step S101, the control unit 12 of the base station 10 (the transmitting end) detects that a failure (Window stall) to receive a response signal generated in response to the transmitted data has occurred. Here, the base station 10 may execute processing of step S102 when, for example, the Window stall continues for a certain period of time and it cannot be expected that the Window stall will be resolved.

Subsequently, the transmitting unit 11 of the base station 10 stops downlink data communication with the terminal 20 (step S102). Subsequently, the transmitting unit 11 of the base station 10 transmits Window update instructions to the terminal 20 (step S103). Here, the control unit 12 of the base station 10 generates PDCP data containing information indicating at least a part of the HFN value held in the base station 10. Then, the transmitting unit 11 of the base station 10 transmits the PDCP data generated by the control unit 12 to the terminal 20.

Therefore, the base station 10 according to an example embodiment of the present disclosure includes Window update instructions in the data of the downlink PDCP and transmits it to the terminal 20 instead of a control signal by an RRC message including the full configuration. This allows to provide the Window update instructions to the module that processes communication of the PDCP layer communication in the terminal 20.

Note that in Non-Patent Literature 1 in which the 3GPP standard for PDCP is described, it is specified that a COUNT value in a 32-bit format is used to generate data bits for secrecy processing. It is also specified that the COUNT value includes a 14-bit HFN value and an 18-bit PDCP SN (Sequence Number) value.

For the secrecy processing to work properly, the terminal 20 and the base station 10 must have the same COUNT value. In addition, according to the Non-Patent Literature 1, the PDCP SN value is notified along with the data. On the other hand, the HFN value is not notified from the base station 10 to the terminal 20 or from the terminal 20 to the base station 10, and is instead held inside both the terminal 20 and the base station 10.

In the window control of the PDCP, the receiving end notifies the transmitting end of the confirmed arrival PDCP SN value, and the processing proceeds in the window of the PDCP with the PDCP SN value as the starting point. The PDCP SN value is incremented for each data transmission. Also, the HFN value is incremented when the PDCP SN value cycles (for example, changes from 262,143 to 0). Since the PDCP SN value cycles repeatedly, the window control of the PDCP is required so that the recognition of the HFN value, which indicates how many times the PDCP SN value has been repeated (i.e. the number of cycles) to obtain the PDCP SN value, by the base station 10 does not become inconsistent with that by the terminal 20.

FIG. 5 shows an example of a data format of PDCP which can include Window update instructions according to an example embodiment of the present disclosure. In the example of the data format 501 shown in FIG. 5, the range of 5-bit reserved (unused) bits (R) 502 specified in the standard (Non-Patent Literature 1, Section 6.2.2.3, "Data PDU for DRBs with 18 bits PDCP SN") includes information for resynchronizing a Window. In the example shown in FIG. 5, in the PDU (Protocol Data Unit) where the PDCP SN value is expressed by 18-bits, out of 5 bits of the reserve bits 502, 1-bit is used for bit 503 for synchronization instruction (Sync. Ind.). Also, the lower-order 4 bits of the HFN value held by the transmitting end are set to the remaining 4 bits 504 (bits 3 to 6 in the PDU).

FIG. 6 shows another example of a data format of PDCP which can include Window update instructions according to an example embodiment of the present disclosure. In the example of a data format 601 shown FIG. 6, the range of reserve bits of 3-bit specified in the standard (Non-Patent Literature 1, Section 6.2.2.2, "Data PDU for DRBs with 12 bits PDCP SN") includes information for resynchronizing the Window. In the example of FIG. 6, in the PDU where the PDCP SN value is expressed by 12-bits, out of 3 bits of the reserve bits 602, one bit is used for the bit 603 for synchronization instruction (Sync. Ind.). Further, the lower-order 2 bits of the HFN value held by the transmitting end are set to the remaining lower-order 2 bits 604 (the 3rd and 4th bits in the PDU). Note that in FIG. 5 and FIG. 6, D/C indicates Data or Control.

The larger the number of bits indicating at a least part of the HFN value included in the transmitted data, the larger the window gap of the PDCP that can be resynchronized. When the lower-order 2 bits of the HFN value are included as in FIG. 6, resynchronization up to three cycles of the PDCP SN can be performed. When the lower-order 4 bits of the HFN value are included as in FIG. 5, resynchronization up to 15 cycles of the PDCP SN can be performed.

In the case where the control unit 12 of the base station 10 uses the data format 501 of FIG. 5, the sync instruction bit 503 is set to "1" and the remaining four bits 504 are set to the lower-order 4 bits of the updated HFN value. When the data format 601 of FIG. 6 is used, the base station 10 sets "1" for the sync instruction bit 603 and sets the lower-order 2 bits of the updated HFN value to the remaining 2 bits 604. This allows the base station 10 to force the Window to proceed with the processing.

Then, the control unit 22 of the terminal 20 (the receiving end) updates (synchronizes) the Window based on the received Window update instructions (step S104). Here, the control unit 22 of the terminal 20 updates, for example, the HFN value held in the terminal 20 based on the information indicating at least a part of the HFN value included in the PDCP data received by the receiving unit 21.

In this case, the terminal 20 updates, for example, the HFN value held in the terminal 20 with the HFN value set in the PDCP data in which "1" is set for the bit for the synchronization instruction. In this case, the terminal 20 updates (replaces, overwrites) one or more bits from the lower-order bits of the HFN value held in the terminal 20 with one or more bits 504 or 604 from the lower-order bits of the HFN value set in the received PDCP data. This resynchronizes the receiving Window with the transmitting Window.

Note that if the base station 10 does not implement processing to forcibly proceed with the processing of the Window, the synchronization instruction bit "0" may be set, but bits 504 or 604 greater than or equal to 1 from the lower-order bits of the HFN value may not be set. Then, if the sync instruction bit "0" is set, the terminal 20 may perform the same processing as processing for the data of the known PDCP without performing the resynchronization processing of the Window in step S104.

<<Effect of the Present Disclosure>>If the transmitting end proceeds with the processing of the Window of the PDCP without synchronizing it with the Window of the receiving end, the receiving end determines that the newly received data in the predetermined range (e.g., SN=131072 to 26143) has been received in the past and discards it. Then, the receiving end determines that the newly received data after SN=0 is the data in the Window of the PDCP and processing it. However, the receiving end cannot recognize that the received data is the data of SN=0 with HFN=3, so it processes the received data as the data of SN=0 with HFN=2. This causes a mismatch in the recognition of the HFN value. When a mismatch occurs in the recognition of the HFN value, the data bits generated for secrecy processing become inconsistent between that by generated by the terminal 20 and that generated by the base station 10, resulting in the improper operation of the secrecy processing and garbling of the decoded data.

When the transmitting end is unable to receive the notification of the PDCP SN value from the receiving end due to packet loss or the like, the window of the PDCP cannot be advanced, and it is not possible to perform data transmission due to the Window stall of the PDCP.

In related techniques such as the 3GPP standard, the Window stall of the PDCP is resolved by sending a control signal with an RRC message including a full configuration from the base station 10 to the terminal 20. Therefore, in the base station 10 and the terminal 20, it is necessary to link (control, inter-process communication, inter-thread communication) between the module that performs processing of the PDCP layer and the module that performs processing of the control signal, respectively. Then the PDCP layer needs to be initialized (reconfigured).

On the other hand, in the technology of the present disclosure, the transmitted PDCP data with the synchronization information attached thereto is transmitted from the base station 10 to the terminal 20. Therefore, in the base station 10 and the terminal 20, there is no need to link between a module that performs processing of the PDCP layer and a module that performs processing of the control signal. In addition, since control signals such as RRC messages including full configuration are not used, the terminal 20 and the base station 10 do not need to reconfigure the PDCP layer. As a result, the period during which data communication is suspended when the reception of the response signal generated in response to the transmitted data fails can be shortened.

Modified examples of the example embodiments of the present disclosure will be described below. Each of the following modified examples may be combined as appropriate with the example embodiments of the present disclosure and implemented.

Modified Example 1

In the examples shown in FIG. 5 and FIG. 6 described above, an example of setting a bit for the sync instruction was described. Alternatively, the sync instruction bit may not be used. In this case, the base station 10 may, for example, set 5 bits 502 of FIG. 5 (bit 2 to bit 6 in the PDU) to the lower-order 5 bits of the HFN value held by the transmitting end. Also, the base station 10 may, for example, set 3 bits 602 of FIG. 6 (bit 2 to bit 4 in the PDU) to the lower-order 3 bits of the HFN value held by the transmitting end.

Then, when the first HFN value held in the terminal 20 does not match the second HFN value set in the received PDCP data, the terminal 20 updates the first HFN value to the second HFN value. In this case, the terminal 20 updates (Replace, Overwrite) one or more bits from the lower-order bits of the HFN value held in the terminal 20 with one or more bits 502 or 602 from the lower-order bits of the HFN value set in the received PDCP data. This resynchronizes the receiving Window with the transmitting Window. This shortens the period during which data communication is not properly performed.

Modified Example 2

In the examples described above, an example in which the base station 10 performs a resynchronization processing of a Window when it detects that a Window stall has occurred in step S101 of FIG. 4 is given. Alternatively, the base station 10 may perform a resynchronization processing of a Window in step S103 and step S104 of FIG. 4 at a predetermined timing, for example, periodically. Also, the base station 10 may perform a resynchronization processing of a Window in step S103 and step S104 of FIG. 4, for example, when notified by the terminal 20 that there is a mismatch in the HEN value. Thus, it is not limited to when a window stall of PDCP occurs, but when there is a mismatch in the HFN value between the terminal 20 and the base station 10, the mismatch can be resolved without being limited to the timing of occurrence of a Window stall of PDCP. Therefore, the period during which data communication cannot be properly performed can be shortened.

Modified Example 3

A case where the base station 10 is a CU/DU isolation configuration in which a central unit (CU) controls one or more distributed units (DUs) will be described. In this case, the control unit 12 of the base station 10 may be provided in the CU. The transmitting unit 11 of the base station 10 may also be provided in the DU. Then, the control unit 12 (CU) may generate PDCP data including Window update instructions in a data format shown in FIG. 5, etc. Then, the transmitting unit 11 (DU) may transmit PDCP data including Window update instructions generated by the CU to the terminal 20.

Modified Example 4

Figure 7:
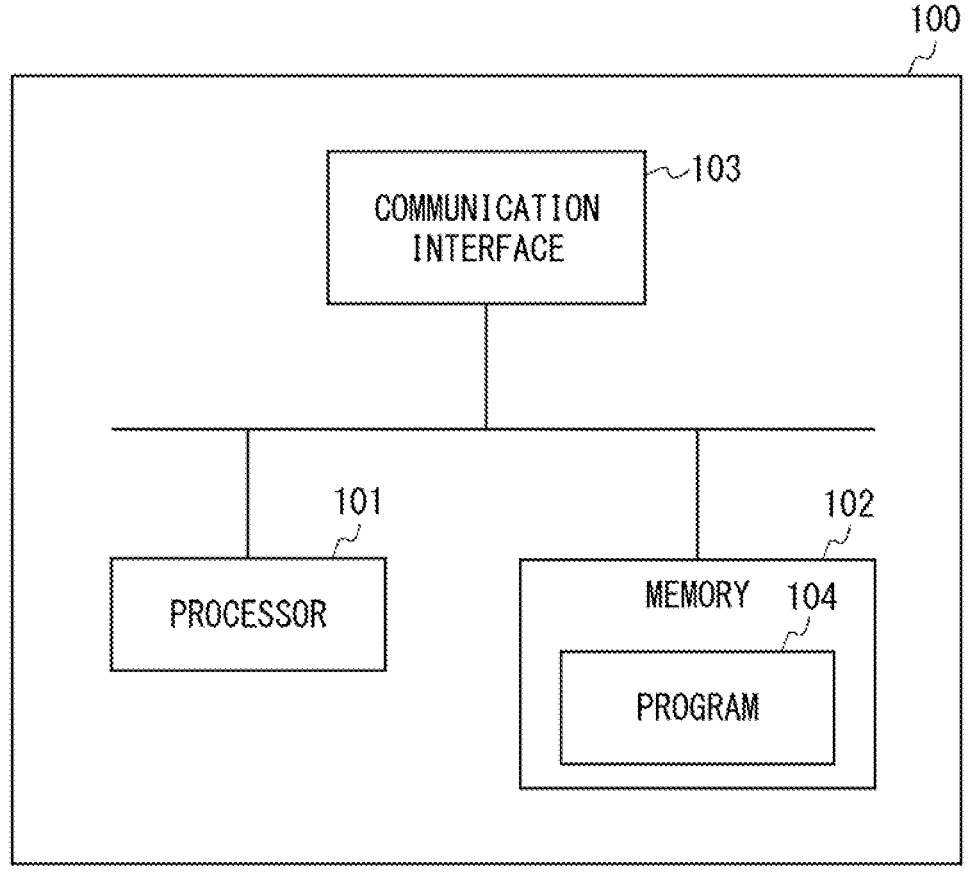
FIG. 7 is a diagram showing an example of a configuration of a based station and a configuration of a terminal.

FIG. 7 is a diagram showing an example of a configuration of a computer 100 in which a computer and a program realize at least a part (e.g., the control unit 12) of the base station 10 or at least a part (e.g., the control unit 22) of the terminal 20. In the example shown in FIG. 7, the computer 100 includes a processor 101, a memory 102, and a communication interface 103. These components may be connected by a bus or the like. The memory 102 stores at least a part of a program 104. The communication interface 103 includes an interface necessary for communication with other network elements. In the case of the base station 10, the communication interface 103 includes, for example, an interface for communication with the terminal 20 through 1 or more antennas, an interface for communication between base stations, and an interface for communication with various servers on the core net-side.

When the program 104 is executed in cooperation with the processor 101, the memory 102, etc., the computer 100 performs processing of at least a portion of example embodiment of the present disclosure. The memory 102 may be of any type suitable for a local technology network. The memory 102 may be, as a non-limiting example, a non-transitory computer-readable medium. The memory 102 may also be implemented using any suitable data storage technology, such as semiconductor-based memory devices, magnetic memory devices and systems, optical memory devices and systems, fixed memory, and removable memory. While the computer 100 shown in FIG. 7 includes only one memory 102, the computer 100 may include a plurality of different physical memory modules. The processor 101 may be of any type. The processor 101 may include a general-purpose computer, a dedicated computer, a microprocessor, a digital signal processor (DSP), and, as a non-limiting example, one or more processors based on a multi-core processor architecture. The computer 100 may have multiple processors, such as an application specific integrated circuit chip that is temporally dependent on a clock that synchronizes the main processor.

The example embodiments of the present disclosure may be implemented in hardware or dedicated circuits, software, logic, or any combination thereof. Some aspect may be implemented in hardware, while other aspect may be implemented in firmware or software that may be executed by a controller, a microprocessor, or other computing devices.

The present disclosure also provides at least one computer program product that is stored tangible in non-transitory computer-readable medium. The computer program product includes computer executable instructions, such as instructions contained in a program module, and is executed by a device on the target real or virtual processor to perform the processes or methods of the present disclosure. Program modules include routines, programs, libraries, objects, classes, components, data structures, etc. that perform specific tasks or implement specific abstract data types. The functions of program modules may be combined or split among program modules as desired in any example embodiment. Machine executable instructions of program modules may be executed in a local or in a discrete device. In a discrete device, program modules may be installed in both local and remote storage media.

Program codes to perform the methods of the present disclosure may be written in any combination of one or more programming languages. These program codes are provided to a processor or a controller of a general-purpose computer, dedicated computer, or other programmable data processing devices. When the program codes are executed by a processor or a controller, the flowchart and/or the functions/operations shown in the block diagrams mounted on the processor or the controller are executed. The program code is executed entirely on the machine, partly on the machine, as a standalone software package, partly on the machine, partly on the remote machine, or entirely on the remote machine or server.

The programs can be stored and provided to a computer using any type of non-transitory computer readable media. Non-transitory computer readable media include any type of tangible storage media. Examples of non-transitory computer readable media include magnetic storage media, optical magnetic storage media, optical disc media, semiconductor memories. Examples of magnetic storage media include floppy disks, magnetic tapes, and hard disk drives. Examples of optical magnetic storage media include magneto-optical disks. Examples of optical disc media include CD (Compact Disc)-ROM (Read Only Memory), CD-R (Recordable), CD-RW (ReWritable). Examples of semiconductor memories include mask ROM, PROM (Programmable ROM), EPROM (Erasable PROM), flash ROM, and RAM (Random Access Memory), etc.). The programs may be stored and provided to a computer using any type of non-transitory computer readable media. Examples of non-transitory computer readable media include any type of tangible storage media. Transitory computer readable media can provide the program to a computer via a wired communication line such as electric wires and optical fibers or a wireless communication line.

It should be noted that present disclosure is not limited to the above example embodiments and can be changed as appropriate without departing from the gist of the present disclosure.

A part or all of the above example embodiments may also be described as in the following supplementary notes, but not limited to the following.

(Supplementary Note 1)

A transmitting apparatus comprising:

control means for generating PDCP (Packet Data Convergence Protocol) data containing information indicating at least a part of a HFN (Hyper Frame Number) value held in the transmitting apparatus, and transmitting means for transmitting the PDCP data generated by the control means to a receiving apparatus.

(Supplementary Note 2)

The transmitting apparatus described in Supplementary Note 1, wherein upon detection of a given event, the control means generates the PDCP data containing information indicating at least a part of the HFN value held in the transmitting apparatus.

(Supplementary Note 3)

The transmitting apparatus described in Supplementary Note 2, wherein the predetermined event is a failure to receive a response signal generated in response to the transmitted PDCP data.

(Supplementary Note 4)

The transmitting apparatus described in any one of Supplementary Notes 1 to 3, wherein the control means generates PDCP data containing PDCP data containing one or more lower-order bits of the HFN value held in the transmitting apparatus.

(Supplementary Note 5)

The transmitting apparatus described in Supplementary Note 4, wherein the control means generates PDCP data containing four or more lower-order bits of the HFN value held in the transmitting apparatus in at least the third to the sixth bit in a PDU (Protocol Data Unit) in which a PDCP SN (Sequence Number) value is expressed by 18-bits.

(Supplementary Note 6)

The transmitting apparatus described in Supplementary Note 4 or 5, wherein the control means generates PDCP data containing two or more lower-order bits of the HFN value held in the transmitting apparatus in at least the third to the fourth bit in a PDU (Protocol Data Unit) in which a PDCP SN (Sequence Number) value is expressed by 12-bits.

(Supplementary Note 7)

A radio communication method comprising:

having a transmitting apparatus generate PDCP (Packet Data Convergence Protocol) data containing information indicating at least a part of a HFN (Hyper Frame Number) value held in the transmitting apparatus; and having the transmitting apparatus transmit the generated PDCP data to a receiving apparatus.

(Supplementary Note 8)

A non-temporary computer-readable medium storing a program for causing a transmitting apparatus to execute:

processing of generating PDCP (Packet Data Convergence Protocol) data containing information indicating at least a part of a HFN (Hyper Frame Number) value held in the transmitting apparatus; and processing of transmitting the generated PDCP data to a receiving apparatus.

(Supplementary Note 9)

A radio communication system comprising a transmitting apparatus and a receiving apparatus, the transmitting apparatus comprising:

control means for generating PDCP (Packet Data Convergence Protocol) data containing information indicating at least a part of a HFN (Hyper Frame Number) value held in the transmitting apparatus; and transmitting means for transmitting the PDCP data generated by the control means to a receiving apparatus, the receiving apparatus comprising:

receiving means for receiving PDCP data transmitted from the transmitting apparatus; and receiving apparatus control means for updating the HFN value held in the receiving apparatus based on information indicating at least the part of the HFN value contained in the PDCP data received by the receiving means.

(Supplementary Note 10)

The radio communication system described in Supplementary Note 9, wherein upon detection of a given event, the receiving apparatus control means generates the PDCP data containing information indicating at least a part of the HFN value held in the transmitting apparatus.

(Supplementary Note 11)

A receiving apparatus comprising:

receiving means for receiving PDCP (Packet Data Convergence Protocol) data containing information indicating at least a part of a HFN (Hyper Frame Number) value held in a transmitting apparatus; and control means for updating the HFN value held in the receiving apparatus based on the information indicating at least a part of the HFN value contained in the PDCP data received by the receiving means.

(Supplementary Note 12)

The receiving apparatus described in Supplementary Note 11, wherein the receiving means receives the PDCP data containing information indicating at least a part of the HFN value held in the transmitting apparatus upon detection of a given event by the transmitting apparatus.

(Supplementary Note 13)

A radio communication method comprising:

having a receiving apparatus receive PDCP (Packet Data Convergence Protocol) data containing information indicating at least a part of a Hyper Frame Number (HFN) value held in a transmitting apparatus, and having the receiving apparatus update the HFN value held in the receiving apparatus based on information indicating at least a part of the HFN value contained in the received PDCP data.

(Supplementary Note 14)

A non-temporary computer-readable medium storing a program for causing a receiving apparatus to execute:

processing of receiving Packet Data processing Convergence Protocol (PDCP) data containing information indicating at least a part of a HFN (Hyper Frame Number) value held in a transmitting apparatus; and processing of updating the HFN value held in the receiving apparatus based on the information indicating at least a part of the HFN value contained in the data of the received PDCP.

The present disclosure has been described above with reference to the example embodiments, but the present disclosure is not limited thereto. Various modifications can be made to the configuration and details of the present disclosure that are understandable to those of ordinary skill in the art within the scope of the invention.

This application is based upon and claims the benefit of priority from Japanese patent application No. 2021-044619, filed on Mar. 18, 2021, the entire disclosure of which are incorporated herein by reference.

REFERENCE SIGNS LIST

1 RADIO COMMUNICATION SYSTEM
10 BASE STATION
11 TRANSMITTING UNIT
12 CONTROL UNIT
20 TERMINAL
21 RECEIVING UNIT
22 CONTROL UNIT
30 CELL

What is claimed is:

1. A transmitting method wherein a computer:

generates PDCP (Packet Data Convergence Protocol) data containing information indicating at least a part of a HFN (Hyper Frame Number) value held in the computer; and transmits the generated PDCP data to a receiving apparatus, wherein the computer generates PDCP data containing four or more lower-order bits of the HFN value held in the computer in at least the third to the sixth bits in a PDU (Protocol Data Unit) in which a PDCP SN (Sequence Number) value is expressed by 18-bits.

2. The transmitting method according to claim 1, wherein upon detection of a given event, the computer generates the PDCP data containing information indicating at least a part of the HFN value held in the computer.

3. The transmitting method according to claim 2, wherein the given event is a failure to receive a response signal generated in response to the transmitted PDCP data.

4. The transmitting method according to claim 1, wherein the computer generates PDCP data containing two or more lower-order bits of the HFN value held in the computer in at least the third to the fourth bits in a PDU (Protocol Data Unit) in which a PDCP SN (Sequence Number) value is expressed by 12-bits.

5. A receiving method wherein a computer:

receives PDCP (Packet Data Convergence Protocol) data containing information indicating at least a part of a HFN (Hyper Frame Number) value held in a transmitting apparatus; and updates the HFN value held in the computer based on the information indicating at least a part of the HFN value contained in the received PDCP data, wherein the computer receives PDCP data containing four or more lower-order bits of the HFN value held in the transmitting apparatus in at least the third to the sixth bits in a PDU (Protocol Data Unit) in which a PDCP SN (Sequence Number) value is expressed by 18-bits.

6. The receiving method according to claim 5, wherein the computer receives the PDCP data containing information indicating at least a part of the HFN value held in the transmitting apparatus upon detection of a given event by the transmitting apparatus.

7. The receiving method according to claim 5, wherein the computer receives PDCP data containing two or more lower-order bits of the HFN value held in the transmitting apparatus in at least the third to the fourth bits in a PDU (Protocol Data Unit) in which a PDCP SN (Sequence Number) value is expressed by 12-bits.

8. A transmitting apparatus comprising:

at least one memory storing instructions; and at least one processor configured to execute the instructions to:

generate PDCP (Packet Data Convergence Protocol) data containing information indicating at least a part of a HFN (Hyper Frame Number) value held in the transmitting apparatus; and transmit the generated PDCP data to a receiving apparatus, wherein the at least one processor generates PDCP data containing four or more lower-order bits of the HFN value held in the transmitting apparatus in at least the third to the sixth bits in a PDU (Protocol Data Unit) in which a PDCP SN (Sequence Number) value is expressed by 18-bits.

* * * * *